United States Patent [19]

Lausch

[11] Patent Number: 5,158,312
[45] Date of Patent: Oct. 27, 1992

[54] WHEEL-SUPPORTED CARRIER DEVICE FOR TRANSPORTING SHEET MATERIAL

[76] Inventor: Clair L. Lausch, 306 Lausch Rd., Denver, Pa. 17517

[21] Appl. No.: 805,245

[22] Filed: Dec. 9, 1991

[51] Int. Cl.⁵ .................................................. B62B 1/14
[52] U.S. Cl. ................................ 280/79.7; 280/47.32; 280/47.33
[58] Field of Search ............ 280/47.11, 47.131, 47.32, 280/47.33, 79.7, 47.2, 47.3; 269/904, 905; 410/3, 44

[56] References Cited

U.S. PATENT DOCUMENTS

| | | | |
|---|---|---|---|
| 150,264 | 4/1874 | Strong | 280/47.131 |
| 605,162 | 6/1898 | Deane | 280/47.131 |
| 785,029 | 3/1905 | Vore | 280/47.3 |
| 897,853 | 9/1908 | Vom Scheidt | 280/79.7 X |
| 2,049,344 | 7/1936 | Wittke, Jr. | 280/47.32 X |
| 2,291,474 | 7/1942 | Kalmbach | 280/79.7 |
| 2,389,584 | 11/1945 | Acker | 280/47.32 X |
| 2,397,315 | 3/1946 | Harris | 280/47.131 X |
| 2,816,771 | 12/1957 | Hunt | 280/47.131 |
| 2,978,257 | 4/1961 | Barker | 280/47.32 |
| 3,090,635 | 5/1963 | Masterson, Jr. | 280/79.7 |
| 3,306,624 | 2/1967 | Goss | 280/79.7 |
| 3,547,457 | 12/1970 | Langer | 280/47.131 |
| 3,580,601 | 5/1971 | Miles | 280/79.7 |
| 3,616,474 | 11/1971 | Lindblad | 280/47.32 |
| 3,698,577 | 10/1972 | Dean | 280/79.7 |
| 3,717,357 | 2/1973 | Schaefer | 280/47.131 X |
| 4,270,741 | 6/1981 | Hurst | 269/905 X |
| 4,488,733 | 12/1984 | Hellsten | 280/79.7 |
| 4,630,838 | 12/1986 | Stockton | 280/79.7 |
| 4,793,624 | 12/1988 | Mace | 280/79.7 |

FOREIGN PATENT DOCUMENTS

| | | | |
|---|---|---|---|
| 486818 | 11/1929 | Fed. Rep. of Germany | 280/47.32 |
| 1434634 | 11/1968 | Fed. Rep. of Germany | 280/47.32 |
| 1089242 | 3/1955 | France | 280/47.131 |

Primary Examiner—Charles A. Marmor
Assistant Examiner—Brian L. Johnson
Attorney, Agent, or Firm—Michael R. Swartz; John R. Flanagan

[57] ABSTRACT

A carrier device for transporting sheet material on edge includes a flat bed disposed horizontally when the carrier device is in a transport position, a carriage having a single swivel-type caster wheel underlying and supporting the bed at one end portion thereof for movement across a surface, and a pair of sidewalls attached lengthwise on the bed and laterally spaced from one another to receive a lower edge of the sheet material between them and having sufficient height to laterally confine the lower edge of the sheet material so as to prevent it from being inadvertently pulled or pushed off the bed. The bed has a pair of opposite side edges extending from the rear to a front end thereof and converging toward one another such that the bed side edges and caster wheel cause movement of the carrier device sideways away from and around an object in its path upon engagement of one side edge of the bed with the object. The carrier device also has a pedestal attached below an opposite end portion of the bed. The pedestal and caster wheel are arranged to maintain the carrier device in an upright freestanding position when unloaded making it easier to load the sheet material thereon. The sidewalls have aligned holes capable of receiving a removable fastener for temporarily attaching the sheet material to the sidewalls so as to permit the carrier device and sheet material to be carried together over objects and up stairways.

13 Claims, 1 Drawing Sheet

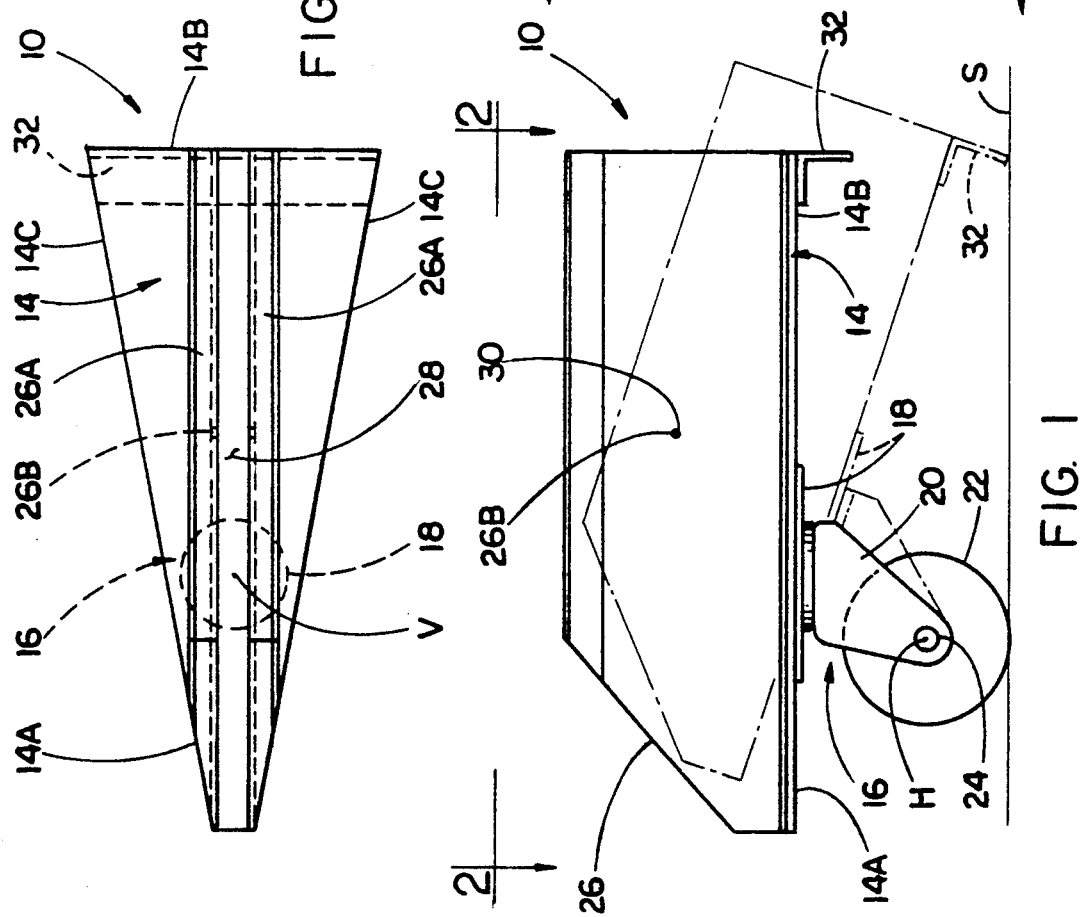

WHEEL-SUPPORTED CARRIER DEVICE FOR TRANSPORTING SHEET MATERIAL

BACKGROUND OF THE INVENTION

1. Field of the Invention

The present invention generally relates to transporting dollys for sheet material and, more particularly, is concerned with an improved wheel-supported carrier device for transporting sheet material on edge.

2. Description of the Prior Art

Workers installing sheets of drywall at construction sites, such as new houses, are ordinarily compensated on a piece basis. This means that in exchange for their labor, workers are paid a set price for each sheet of drywall installed. Thus, the highest compensation is earned by those workers who are able to install the highest numbers of sheets of drywall in a given period of time. As a result, speed of installation is a major concern to workers installing drywall.

Typically drywall sheet sizes are $4 \times 8$, $4 \times 10$, $4 \times 12$ and $4 \times 16$ width times length in feet and thicknesses of either one-half or five-eights inch. After being unloaded at the construction site, the sheets of drywall must be manually carried through doorways, along hallways, and up stairways to reach the place of installation. A single sheet of drywall of the aforementioned sizes weighs from 100-150 pounds. Thus, it is difficult for a single worker to maneuver the sheet without causing some damage to it. Typically, the worker has to drag or push the sheet of drywall over the floor and around corners of the inside framework of the house. This causes damage to the corners of the drywall sheet. Damage to sheets of drywall necessitates repair which increases cost.

Many different dollys and carriers have been proposed in the prior patent art for transporting sheet material. Representative examples of the prior art devices are the ones disclosed in U.S. Pat. No. 2,291,474 (Kalmbach), U.S. Pat. No. 3,090,635 (Masterson, Jr.,) U.S. Pat. No. 3,306,624 (Goss), U.S. Pat. No. 3,580,601 (Miles), U.S. Pat. No. 3,698,577 (Dean), U.S. Pat. No. 4,488.733 (Hellsten), U.S. Pat. No. 4,630,838 (Stockton) and U.S. Pat. No. 4,793,624 (Mace). Except for the dolly disclosed in the Masterson patent, the devices of these prior art patents appear to be too complicated, bulky and large to provide a satisfactory solution to the problem of the difficulty in handling heavy sheets of drywall at construction sites. Even the design of the Masterson dolly has certain shortcomings which make it much less than an optimum solution.

First, the Masterson dolly includes an elongated bed supported by a pair of wheels mounted for rotation in a fixed direction along opposite sides of the bed by a transverse axle. The wheels are thus mounted solely to rotate about a common transverse axis and not to swivel about vertical axes. This manner of mounting the wheels makes it difficult to maneuver around corners.

Second, the elongated bed of the Masterson dolly has a top longitudinal recess of concave cross-sectional shape which receives and supports the sheet of material on edge. A bed of this shape will provide inadequate lateral confinement of the lower edge of the sheet and thereby fail to prevent the sheet from inadvertently being pulled or pushed off the dolly from time to time, particularly while maneuvering the sheet and dolly around corners.

Consequently, a need still exists for improvements in devices for transporting sheet material, such as drywall, about construction sites so as to reduce the incidence of damage to the drywall and the difficulty of the overall installation process.

SUMMARY OF THE INVENTION

The present invention provides a wheel-supported carrier device designed to satisfy the aforementioned needs. The wheel-supported carrier device of the present invention has features which cooperate to improve the ability of workers to transport sheet material, such as drywall, about a construction site in a manner which lessens the likelihood of damage to the drywall sheet material and reduces overall the amount of time and effort expended in installing a sheet of drywall.

One feature of the carrier device of the present invention is a single swivel-type caster wheel underlying and supporting a substantially flat bed of the device at one end portion of the bed. The caster wheel being rotatable about a horizontal axis and swivelible about a vertical axis greatly increases the maneuverability of the device.

Another feature of the carrier device is the substantially flat bed supported by the single caster wheel which has a pair of opposite side edges that converge from the rear end to the front end of the bed. The converging side edges of the bed will engage objects in the path of movement of the device and cause the device to move sideways away from them as it moves past them. This manner of movement prevents the sheet material from coming into damage-inducing contact with the objects.

Still another feature of the carrier device is a pedestal attached below an opposite end portion of the flat bed of the device. The pedestal and the caster wheel are arranged to maintain the device in an upright freestanding position when unloaded so as to make it easier to load a sheet of material on it.

A further feature of the carrier device is a pair of upright sidewalls on the flat bed of the device which are laterally spaced from one another and have sufficient height to receive and laterally confine the lower edge of the sheet of material on the bed so as to prevent it from being inadvertently pulled or pushed off the bed of the carrier device.

Yet another feature of the carrier device is a pair of transversely aligned holes defined in the sidewalls which can accommodate a pin or nail for temporarily attaching the sheet material to the sidewalls of the device. This feature permits the carrier device and sheet material to be moved together over objects and up stairways.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a side elevational view of a wheel-supported sheet material carrier device of the present invention.

FIG. 2 is a top plan view of the carrier device as seen along line 2—2 of FIG. 1.

FIG. 3 is an end elevational view of the carrier device as seen along line 3—3 of FIG. 1.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the FIGS. 1-3 of the drawings, there is shown a wheel-supported carrier device of the present invention, being generally designated 10 and adapted for transporting sheet material 12, such as panels of drywall or plywood. The carrier device 10 shown in solid line form in FIG. 1 is in a transport position and shown in dashed line form in FIG. 1 is in a freestanding stationary position.

The carrier device 10 basically includes a flat bed 14 and a mobile carriage 16. The flat bed 14 is disposed in a horizontal orientation when the carrier device 10 is in the transport position loaded with the drywall sheet 12 and is disposed in an inclined orientation when the carrier device 10 is in the freestanding stationary position. The mobile carriage 16 is mounted below the bed 14 adjacent to one end portion 14A thereof and supports the bed 14 for movement across a surface S. The mobile carriage 16 includes a mounting plate 18 fixed to the bottom of the bed 14 at the one end portion 14A thereof, a bifurcated bracket 20 mounted to the plate 18 for rotation about a vertical axis V, and a single caster wheel 22 mounted to the bracket 20 by an axle 24 for rotation about a horizontal axis H. The caster wheel 22 thus underlies and supports the flat bed 14 at the one end portion 14A thereof and is mounted thereto for rotation about the horizontal axis H and for swiveling about the vertical axis V.

The carrier device 10 also includes a pair of sidewalls 26 attached lengthwise and extending upright on the flat bed 14. The sidewalls 26 are laterally spaced apart from one another a sufficient displacement to define a gap 28, as seen in FIGS. 2 and 3, being just large enough to receive a lower edge 12A of the sheet of drywall material 12 between them. The sidewalls 26 have short heights sufficient to laterally confine the lower edge 12A of the sheet material 12 so as to prevent it from being inadvertently pulled or pushed off the bed 14. The upper edges 26A of the sidewalls 26 are oppositely flared outwardly to facilitate insertion of the lower edge 12A of the sheet material 12 into the gap 28 between the sidewalls 26. Also, the sidewalls have aligned holes 26B formed therethrough being capable of receiving a removable fastener 30, such as a nail or screw, for temporarily attaching the sheet material 12 to the sidewalls 26 so as to permit the carrier device 10 and sheet material 12 to be lifted and carried together over objects and up stairways.

The flat bed 14 has a pair of opposite side edges 14C extending from the opposite end portion 14B to the one end portion 14A and converging toward one another such that the bed 14 has a generally triangular shape, as seen in FIG. 2. The converging side edges 14C of the bed 14 and the caster wheel 22 of the mobile carriage 16 will cooperate to cause movement of the carrier device 10 sideways away from and around any object in its path upon engagement of either one of the side edges 14C of the flat bed 14 with the object. Such maneuverability of the carrier device 10 helps to prevent damage-inducing contact with objects such as the framework of the building at the construction site.

The carrier device 10 also includes a short pedestal 32 in the form of an angle member attached below and extending transversely across the opposite end portion 14B of the flat bed 14. When the carrier device 10 is loaded and held at the solid line transport position shown in FIG. 1, the pedestal 32 is spaced above the surface S so as not to impede the movement of the carrier device 10 about a construction side. On the other hand, when the carrier device 10 is unloaded and disposed at the dashed line position shown in FIG. 1, the pedestal 32 rests on the surface S and maintains the caster wheel 22 of the mobile carriage 16 and thereby the carrier device 10 in the upright freestanding stationary position. In the latter position, the carrier device 10 is oriented so as to make it easier to load the sheet material 12 onto the flat bed 14 and into the gap 28 between the sidewalls 26.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A wheel-supported carrier device for use in transporting a sheet of material on edge, said carrier device comprising:
   (a) a substantially flat bed being disposed horizontally when said carrier device is in a transport position;
   (b) a carriage attached to and underlying said bed at one end portion thereof and having a single caster wheel means being rotatable about a horizontal axis and swivelible about a vertical axis so as to provide the sole means of support of said bed for movement along a path across a surface; and
   (c) means mounted upright on said bed for receiving and laterally confining a lower edge of the sheet of material on said bed so as to prevent the sheet of material from being inadvertently pulled or pushed off said bed;
   (d) said bed having a pair of opposite side edges tapering toward one another such that said bed side edges and caster wheel means cooperate to cause movement of said carrier device sideways away from and around an object in the path of said carrier device upon engagement of one of said side edges with the object.

2. The carrier device as recited in claim 1, further comprising:
   a pedestal attached below an opposite end portion of said bed, said pedestal and caster wheel being arranged to maintain said carrier device in an upright freestanding position when unloaded so as to facilitate easier loading of the sheet of material on said bed.

3. The carrier device as recited in claim 2, wherein said opposite end portion is wider than said one end portion of said bed.

4. The carrier device as recited in claim 1, wherein said receiving and confining means includes a pair of upright sidewalls attached lengthwise on said bed and laterally spaced from one anther so as to define a gap in which to receive the lower edge of the sheet of material therebetween and having sufficient height to laterally confine the lower edge of the sheet of material so as to prevent the sheet of material from being inadvertently pulled or pushed off said bed.

5. The carrier device as recited in claim 4, wherein said sidewalls have upper edges being oppositely flared outwardly to facilitate insertion of the lower edge of the sheet material into said gap between said sidewalls.

6. The carrier device as recited in claim 1, wherein said receiving and confining means includes a pair of upright sidewalls laterally spaced from one another to receive the lower edge of the sheet of material therebetween, said sidewalls having a pair of transversely aligned holes defined therein being capable of receiving a removable fastener for temporarily attaching the sheet of material to said sidewalls so as to permit said carrier device and sheet of material to be carried together over objects and up stairways.

7. A wheel-supported carrier device for use in transporting a sheet of material on edge, said carrier device comprising:
 (a) a substantially flat bed being disposed horizontally when said carrier device is in a transport position;
 (b) a mobile carriage attached to and underlying said bed at one end portion thereof and having a single caster wheel means being rotatable about a horizontal axis and swivelible about a vertical axis so as to provide the sole means of support of said bed for movement along a path across a surface; and
 (c) a pair of sidewalls attached lengthwise along and extending upright from said bed and laterally spaced from one another so as to define a gap to receive a lower edge of the sheet of material therebetween and having sufficient height to laterally confine the lower edge of the sheet material so as to prevent the sheet material from being inadvertently pulled or pushed off said bed;
 (d) said flat bed having a pair of opposite side edges extending from an opposite end portion to said one end portion of said bed and tapering toward on another such that said bed side edges will cause movement of said carrier device sideways away from and around an object in the path of said carrier device upon engagement of one of said side edges with the object.

8. The carrier device as recited in claim 7, further comprising:
 a pedestal attached below said opposite end portion of said bed, said pedestal and mobile carriage being arranged to maintain said carrier device in an upright freestanding position when unloaded so as to facilitate easier loading of the sheet of material on said bed.

9. The carrier device as recited in claim 7, wherein said laterally spaced upright sidewalls have a pair of transversely aligned holes defined therein being capable of receiving a removable fastener for temporarily attaching the sheet material to said sidewalls so as to permit said carrier device and sheet of material to be carried together over objects and up stairways.

10. The carrier device as recited in claim 7, wherein said sidewalls have upper edges being oppositely flared outwardly to facilitate insertion of the lower edge of the sheet material into said gap between said sidewalls.

11. A wheel-supported carrier device for use in transporting a sheet of material on edge, said carrier device comprising:
 (a) a substantially flat bed being disposed horizontally when said carrier device is in a transport position;
 (b) a mobile carriage mounted below said bed at one end portion thereof and supporting said bed for movement along a path across a surface, said mobile carriage including a single caster wheel underlying and supporting said bed at said one end portion thereof and being mounted for rotation about a horizontal axis and for swiveling about a vertical axis;
 (c) a pedestal attached below an opposite end portion of said bed, said pedestal and mobile carriage being arranged to maintain said carrier device in an upright freestanding position when unloaded so as to make it easier to load the sheet of material on said bed; and
 (d) a pair of sidewalls attached lengthwise along and extending upright from said bed and laterally spaced from one another to receive a lower edge of the sheet of material therebetween and having sufficient height to laterally confine the lower edge of the sheet material so as to prevent the sheet material from being inadvertently pulled or pushed off said bed;
 (e) said flat bed having a pair of opposite side edges extending from said opposite end portion to said one end portion of said bed and converging toward one another such that said bed side edges and caster wheel cooperate to cause movement of said carrier device sideways away from and around an object in the path of said carrier device upon engagement of one of said side edges with the object.

12. The carrier device as recited in claim 11, wherein said laterally spaced upright sidewalls have a pair of transversely aligned holes defined therein being capable of receiving a removable fastener for temporarily attaching the sheet of material to said sidewalls so as to permit said carrier device and sheet of material to be carried together over objects and up stairways.

13. The carrier device as recited in claim 11, wherein said sidewalls have upper edges being oppositely flared outwardly to facilitate insertion of the lower edge of the sheet material into said gap between said sidewalls.

* * * * *